(12) United States Patent
Doushita et al.

(10) Patent No.: US 6,576,344 B1
(45) Date of Patent: Jun. 10, 2003

(54) PHOTOCATALYST ARTICLE, ANTI-FOGGING, ANTI-SOILING ARTICLES, AND PRODUCTION METHOD OF ANTI-FOGGING, ANTI-SOILING ARTICLES

(75) Inventors: Kazuhiro Doushita, Osaka-fu (JP); Hiroyuki Inomata, Osaka-fu (JP)

(73) Assignee: Nippon Sheet Glass Co., Ltd., Osaka-fu (JP)

( * ) Notice: Subject to any disclaimer, the term of this patent is extended or adjusted under 35 U.S.C. 154(b) by 0 days.

(21) Appl. No.: 09/577,299

(22) Filed: May 24, 2000

Related U.S. Application Data

(63) Continuation of application No. PCT/JP99/05304, filed on Sep. 28, 1999.

(30) Foreign Application Priority Data

Oct. 30, 1998 (JP) .......................................... 11-279058

(51) Int. Cl.$^7$ ........................ B32B 17/06; C04B 35/495
(52) U.S. Cl. ........................ 428/426; 428/325; 428/336; 428/428; 428/432; 428/446; 428/702; 501/134; 501/154
(58) Field of Search .................. 428/426, 428, 428/432, 429, 446, 447, 448, 701, 702; 501/134, 154

(56) References Cited

U.S. PATENT DOCUMENTS

| 5,854,708 A | * | 12/1998 | Komatsu et al. | ............ | 359/512 |
| 5,869,187 A | | 2/1999 | Nakamura et al. | .......... | 428/428 |
| 6,074,981 A | * | 6/2000 | Tada et al. | .................. | 502/224 |
| 6,194,346 B1 | * | 2/2001 | Tada et al. | .................. | 502/224 |

FOREIGN PATENT DOCUMENTS

| EP | 0 088 266 A1 | 9/1983 |
| EP | 0 816 466 A1 | 1/1998 |
| EP | 0 820 967 A1 | 1/1998 |
| JP | 61-9264 A | 7/1981 |
| JP | 1-232966 A | 9/1989 |
| JP | 1-238867 A | 9/1989 |
| JP | 1-288321 A | 11/1989 |
| JP | 1-288322 A | 11/1989 |
| JP | 6-220428 A | 8/1994 |
| JP | 7-117202 A | 5/1995 |
| JP | 7-124464 A | 5/1995 |
| JP | 7-225704 A | 8/1995 |
| JP | 9-56742 | 3/1997 |
| JP | 9-192496 A | 7/1997 |
| JP | 9-241037 A | 9/1997 |
| JP | 9-262482 A | 10/1997 |
| JP | 9-267037 A | 10/1997 |
| JP | 9-299808 A | 11/1997 |
| JP | 10-36144 | 2/1998 |
| JP | 2756474 | 3/1998 |
| JP | 10-152346 A | 6/1998 |
| JP | 10-231146 | 9/1998 |
| WO | WO 96/29375 | 9/1996 |
| WO | WO 98/05413 | 2/1998 |

OTHER PUBLICATIONS

T. Komatsuzawa et al., "New Soil–Proof Coatings", Coating Technology, Jan. 1995, pp. 94–99.

S. Tanaka, "Degradation by Soiling and Soil–Proof Coating Technologies (Industrial Coatings)", Coating Technology, Oct. 1996 extra issue, pp. 95–105.

\* cited by examiner

*Primary Examiner*—Deborah Jones
*Assistant Examiner*—Stephen Stein
(74) *Attorney, Agent, or Firm*—Edwards & Angell, LLP; David G. Conlin, Esq.; Gregory B. Butler, Esq.

(57) ABSTRACT

A photocatalyst article exhibits high photocatalytic activity even in environments illuminated by weak ultraviolet light or visible light, expresses excellent anti-fogging and anti-soiling properties, and retains good anti-fogging and anti-soiling performance over long periods and therefore has a high utilization value as an anti-fogging, anti-soiling article. The photocatalyst article contains an oxide semiconductor and a compound which contains at least one type of element selected from the group comprised of Mg, Sc, V, Cr, Mn, Y, Nb, Mo, Ru, W, and Re, at a content such that the ratio (A/B) of the number of metal atoms of the abovementioned element (A) to the number of atoms of metal that comprise the abovementioned oxide semiconductor (B) will be about 0.20 to 2.

26 Claims, No Drawings

1

PHOTOCATALYST ARTICLE, ANTI-FOGGING, ANTI-SOILING ARTICLES, AND PRODUCTION METHOD OF ANTI-FOGGING, ANTI-SOILING ARTICLES

This application is a continuation of copending application International Application PCT/JP99/05304 filed on Sep. 28, 1999 and which designated the U.S.

FIELD OF THE ART

The present invention concerns anti-fogging, anti-soiling articles, wherein an anti-fogging film or anti-soiling film is formed on the surface of a substrate, such as glass, ceramic, plastic, or metal, etc., methods of producing such articles, and compositions for forming such articles. In particular, the present invention concerns anti-fogging, anti-soiling articles, which are suitable as window glass, mirrors, lenses, air conditioner heat exchanger fins, biological materials, film sheets, showcases, etc., that are used for construction, vehicles, optical parts, industrial use, agricultural use, goods for daily use, and residential and medical purposes, provide good anti-fogging or anti-soiling performance over long periods, and in particular exhibit their performance under weak ultraviolet light or visible light, the methods of producing such articles, and compositions for forming such articles.

BACKGROUND ART

Since priorly, there have been strong needs for anti-fogging, anti-soiling glass plates, mainly in the fields of automobiles and construction. Especially with automobiles, the addition of anti-fogging properties to window glass is becoming an important issue from the standpoint of safe driving.

Since priorly, various anti-fogging coatings for glass articles have been examined. These include, for example, a coating of an organic and/or inorganic thin film containing a surfactant (Laid-open Japanese Patent Publication (Koukai) No. Hei 7-117202; first method), a coating of hydrophilic polymer (Japanese Patent Publication (Koukoku) No. Shou 61-9264; second method), and a coating of an organic-inorganic complex film containing an organic hydrophilic functional group (Laid-open Japanese Patent Publication (Koukai) No. Hei 6-220428; third method), etc.

Also recently, anti-fogging, anti-soiling articles have been proposed in which titanium oxide, which is an oxide semi-conductor that acts as a photocatalyst, is coated onto the surface of a substrate (Japanese Patent No. 2756474; fourth method 4). This method makes use of the phenomenon wherein the titanium oxide on the glass surface absorbs ultraviolet light and the organic substance adsorbed on the glass surface is oxidized and decomposed efficiently by the energy of the absorbed ultraviolet light to provide a clean surface with significant hydrophilic properties. Also, since the entire anti-fogging, anti-soiling articles is made of inorganic substances in terms of material, it is excellent in mechanical strength, and even when dirt becomes attached, the surface can be made clean again and the hydrophilic surface can be revived once it is exposed to ultraviolet light. As long as the surface retains hydrophilic properties, it will be difficult for black, lipophilic dirt, which is the type of dirt encountered in urban settings, to become attached, and any attached dirt will be removed readily by rain (see for example, Toshiki Komatsuzawa and Toshikazu Nakaiye, "New Anti-soiling Coatings," Coating Technology, Jan., 1995, 94–99 (1995); Shoichi Tanaka, "Degradation by Soiling and Anti-soiling Coating Technologies (Industrial Coatings)," Coating Technology, Oct., 1996 extra issue, 95–102 (1995)). So-called self-cleaning properties are thus provided, enabling use as anti-soiling material.

In such methods using titanium oxide, the photocatalytic activity of the titanium oxide may be pointed out as an important factor that determines anti-fogging and anti-soiling performance. Methods for improving the photocatalytic activity of titanium oxide include a method in which titanium oxide is made to carry a precious metal (see for example, Catalyst Vol. 19 No. 5, 334–350 (1977)), a method in which titanium oxide is made to carry a vanadium compound (see for example, Laid-open Japanese Patent Publication No. Hei 7-275704), a method in which niobium is dissolved in titanium oxide (see for example, Laid-open Japanese Patent Publication No. Hei 9-267037), a method in which titanium oxide is doped with fluorine (see for example, International Patent Publication WO 98/05413).

Also, methods for obtaining titanium oxide that exhibit photocatalytic activity under illumination by visible light include a method for doping a minute amount of dopant selected from the group comprised of vanadium, chromium, manganese, iron, cobalt, nickel, and copper (Laid-open Japanese Patent Publication No. Hei 9-192496) and a method in which a minute amount of metal ion, selected from the group comprised of chromium, vanadium, copper, iron, magnesium, silver, palladium, nickel, manganese, and platinum, is injected into a titanium oxide crystal. (Laid-open Japanese Patent Publication No. Hei 9-262482).

With the abovementioned first method, although the initial performance is excellent, since the surfactant is consumed gradually, it has the disadvantage of being short in life.

Although the second method is an effective means depending on the application, it cannot be applied to glass for automobiles, buildings, etc., with which a relatively large mechanical strength is required.

Although the third method was proposed so that both anti-fogging performance and mechanical strength will be provided at the same time, both types of performance are limited with this method. Also with this method, the anti-fogging performance drops significantly once dirt, etc., become attached.

Though the fourth method in principle has features that cannot be realized by the other methods, since the intensity of ultraviolet light in the interior of a vehicle or building is extremely weak, anti-fogging article that can be put to practical use have not yet been obtained by this method. Also with anti-soiling articles, there are problems wherein use is difficult at locations where the intensity of ultraviolet light is weak.

On the other hand, compositions and article obtained by the abovementioned prior arts that purport to improve the photocatalytic activity of titanium oxide upon ultraviolet light illumination or the expression of photocatalytic activity under visible light illumination do not exhibit adequate anti-fogging performance under illumination of weak ultraviolet light or visible light, and since the improvement of hydrophilicity is also inadequate, it cannot be said that such compositions and article are improved significantly in anti-fogging and anti-soiling performance over ordinary titanium oxide.

The present invention has been made in view of the prior arts and an article thereof is to provide compositions, which express excellent anti-fogging and anti-soiling properties even under environments of weak ultraviolet light or visible light and can maintain good anti-fogging and anti-soiling performance over long periods, and anti-fogging, anti-soiling articles with excellent anti-fogging and anti-soiling performance that can be used, for example, in window glass for automobiles and buildings, mirrors, optical parts, as well as glasses, etc.

DISCLOSURE OF THE INVENTION

As a result of diligent examination towards achieving the above article, the present inventors have found that (1) by adding a significantly large amount of a specific metal compound to titanium oxide or other oxide semiconductor, the hydrophilicity is improved by illumination of weak ultraviolet light or visible light, (2) by adding silicon oxide to this composition, the anti-fogging and anti-soiling performance is improved further, and (3) the performance is improved further if the titanium oxide takes the form of microparticles.

The present inventors also found that (4) when an overcoat layer comprised of metal oxide is formed after forming such a composition as a thin film on a substrate, the anti-fogging and anti-soiling properties are improved and/or (5) by forming an organic substance adhesion prevention layer comprised of a silicon oxide layer or an organosilane layer, the anti-fogging and anti-soiling performance is improved, and have thus come to complete the present invention.

That is, the present invention provides in a photocatalyst article including oxide semiconductors, a photocatalyst article characterized in containing a compound, which contains at least one type of element selected from the group comprised of Mg (magnesium), Sc (scandium), V (vanadium), Cr (chromium), Mn (manganese), Y (yttrium), Nb (niobium), Mo (molybdenum), Ru (ruthenium), W (tungsten), and Re (rhenium), at a content whereby the ratio (A/B) of the number of metal atoms of the abovementioned element (A) to the number of atoms of metal that comprises the oxide semiconductor (B) will be 0.1 to 2. Examples of oxide semiconductors that may be used include metal oxide semiconductors, such as $TiO_2$, $ZnO$, $SnO_2$, $SrTiO_3$, $WO_3$, $Bi_2O_3$, $Fe_2O_3$, $In_2O_3$, $MoO_2$, etc. Among these, titanium oxide ($TiO_2$), which is high in catalytic activity and exhibits excellent physicochemical stability, is used preferably. In the case where $WO_3$ (or $MoO_2$) is used as the oxide semiconductor, a compound besides the oxide of W (or Mo) is used as the abovementioned compound.

The present invention also provides an anti-fogging, anti-soiling articles with which a thin film, which contains (1) at least one type of element selected from the group comprised of Mg, Sc, V, Cr, Mn, Y, Nb, Mo, Ru, W, and Re and (2) an oxide semiconductor at contents such that the ratio (A/B) of the number of metal atoms of the abovementioned element (A) to the number of atoms of metal that comprises the oxide semiconductor (B) will be 0.1 to 2, is formed on the surface of a substrate.

The photocatalyst article of the present invention may take on any form, such as powder, fiber, flakes, film, coating, plate-like members, etc. When the minimum dimension or film thickness of the photocatalyst article exceeds 500 nm, the portion that exceeds this dimension (the deep part measured from the surface) will be lowered in photoactive catalytic action. Thus, the minimum dimension or film thickness of the photocatalyst article is preferably 2 to 2000 nm. This photocatalyst article can be produced favorably by a sol-gel method.

The case where a photocatalyst thin film, which contains titanium oxide as the oxide semiconductor, is coated onto a substrate surface shall now be described.

Three conditions must be met simultaneously in order to obtain excellent anti-fogging and anti-soiling functions using a photocatalyst. One is that the organic material, which becomes adsorbed onto the surface of the photocatalyst film and causes fogging and soiling, will be oxidized and decomposed efficiently (high photocatalytic activity). The second condition is that organic material will not become adsorbed onto the surface readily (adsorption prevention property). The third condition, which is especially required of anti-fogging property, is that the apparent contact angle of an attached water drop is small (low contact angle). Only when the above three conditions are satisfied can good anti-fogging and anti-soiling properties be expressed over long periods.

A high photocatalytic activity cannot be obtained by simply coating a titanium oxide film or other photocatalyst film directly onto the surface of a glass substrate. This is because Na ions and other alkali metal ions which diffuse from inside a glass substrate contain alkali metals to the exterior in the process of heat treatment and combine chemically with the titanium oxide to lower the crystallinity of the titanium oxide in the film. When a glass material containing an alkali metal is to be used as the substrate, a silicon oxide film or other alkali-blocking film is provided on the glass substrate to prevent the above-described lowering of crystallinity of the titanium oxide film, and the photocatalyst film containing titanium oxide is then coated above this alkali-blocking film.

[Alkali-Blocking Film]

A film of a composition with a single component or multiple components, selected from the group comprised of silicon oxide, aluminum oxide, titanium oxide, zirconium oxide, and cerium oxide, is favorably used as the above-described alkali-blocking film. Among these, a film, having a single component of silicon oxide (silica) or multiple components with silicon oxide as the main component, is preferable, and a two-component metal oxide film of silicon oxide and zirconium oxide is even more preferable. A metal oxide having silicon oxide as the main component is preferable since it will be low in the refractive index and enable film formation without considerably degrading the optical properties of the glass plate. Further, a two-component metal oxide of silicon oxide and zirconium oxide is even more preferable since the alkali-blocking performance is extremely high and an oxide with a zirconium oxide content of 1 weight % or more and 30 weight % or less is especially preferable.

When this content is less than 1 weight %, the alkali-blocking performance improvement effect will not differ much from that of silicon oxide alone, and when the content is higher than 30 weight %, not only will the alkali-blocking performance improvement effect not increase further but since there will be a tendency for the reflectance to increase due to the increased refractive index, the control of the optical properties of the glass plate will be difficult.

The thickness of the above-described alkali-blocking film is preferably 5 nm or more and 300 nm or less. When the thickness is less than 5 nm, the alkali-blocking effect will not be effective, and a thickness of more than 300 nm is not preferable since interference colors due to the film will become significantly visible and control of the optical properties of the glass plate will be difficult.

The above-described alkali-blocking film can be formed by a known method. Examples include sol-gel methods (for example, Yuji Yamamoto, Kannichi Kamiya, Sumio Tsukuribana, Ceramics Association Journal, 90, 328–333 (1982)), liquid-phase precipitation methods (for example, Japanese Patent Publication No. Hei 1-59210, Japanese Patent Publication No. Hei 4-13301), vacuum film-forming methods (vacuum vapor deposition, sputtering), baking and spray coating methods (for example, Laid-open Japanese Patent Publication No. Sho 53-124523, Laid-open Japanese Patent Publication No. Sho 56-96749), CVD methods (for example Laid-open Japanese Patent Publication No. Sho 55-90441, Laid-open Japanese Patent Publication No. Hei 1-201046, Laid-open Japanese Patent Publication No. Hei 5-208849), etc.

[Photocatalyst Film]

The photocatalyst film contains (1) a compound containing at least one type of element selected from among Mg, Sc, V, Cr, Mn, Y, Nb, Mo, Ru, W, and Re and (2) an oxide semiconductor and preferably contains (3) silica as well.

As the abovementioned oxide semiconductor, titanium oxide is preferably used from the standpoint of high catalytic activity and excellent physicochemical stability. The following description shall concern the case where titanium oxide is used as the oxide semiconductor.

Compounds that may be used as the compound containing at least one type of element selected from among Mg, Sc, V, Cr, Mn, Y, Nb, Mo, Ru, W, and Re include chlorides, nitrates, sulfates, acetylacetone compounds, ammonium salts, phosphates, hydroxides, ortho-acids, iso-polyacids, hetero-polyacids, ortho-acid salts, iso-polyacid salts, hetero-polyacid salts, oxides, etc., of the respective metals. Among the above elements, V, Nb, and Mo are preferably used.

In a photocatalyst film, the ratio (A/B) of the number of metal atoms of the abovementioned compound (A) to the number of atoms of Ti (B) is greater than or equal to 0.20 and less than or equal to 2. When this ratio is less than 0.20, anti-fogging and anti-soiling performance will not be exhibited by illumination of weak ultraviolet light or visible light, and a ratio that is greater than 2 is not preferable since the transparency of the thin film will then be low and the durability will be lowered as well. In order to shorten the period for the exhibition of anti-fogging and anti-soiling properties, the abovementioned ratio is preferably 0.3 or more, and in order to keep the haze of the film at a low level, the ratio is preferably less than or equal to 1.0.

When the ratio (A/B) of the number of metal atoms of the abovementioned compound (A) to the number of atoms of Ti (B) is greater than or equal to 0.20 and less than or equal to 2, the abovementioned compound tends to exist in aggregated form and the abovementioned compound forms a type of junction interface with the titanium oxide crystal. Since the separation of positive holes and electrons resulting from illumination of light is promoted at this interface, hydrophilicity is exhibited even under weak ultraviolet light. It is furthermore considered that hydrophilicity is exhibited even under visible light illumination due to the effective injection of charges, that arise in the abovementioned compound due to visible light illumination, into the titanium oxide. It can thus be said that an article in which only a minute amount of the compound is added or a uniform solid solution, which does not have an effective junction interface of the abovementioned compound and titanium oxide, will not exhibit anti-fogging and anti-soiling properties under illumination by weak ultraviolet light or visible light.

Though the photocatalyst film of the present invention is made using ordinary thin-film production methods, among such methods, sol-gel methods are preferably applied.

The coating solution for forming the photocatalyst film on the substrate is prepared by mixing the abovementioned compound containing at least one type of element selected from among Mg, Sc, V, Cr, Mn, Y, Nb, Mo, Ru, W, and Re, the titanium oxide raw material, and the silicon oxide or silica compound in a solvent and if necessary, adding water, an acid catalyst, a stabilizer, and a dispersing agent.

Hydrolyzable, condensation-polymerizable organic titanium compounds, titanium tetrachloride, hydrolysates of such compounds, and titanium oxide, titanium oxide colloids, and titanium oxide microparticles, which are obtained by heat treatment of the aforementioned compounds may be used favorably as the raw material for the titanium oxide microparticles that are to be made to exist within the film. Also, commercially available suspensions in which titanium oxide microparticles are dispersed in a silica binder may be used readily and thus favorably. Examples of commercially available suspensions include "ST-K01" (made by Ishihara Sangyo Co., Ltd., titanium oxide content: 8 weight %, silica binder content: 2 weight %) and "CA-62" (made by Taki Chemical Ltd., titanium oxide content: 6 weight %, silica binder content: 1.5 weight %).

Titanium alkoxides, such as the methoxide, ethoxide, propoxide, butoxide, etc., of titanium, may be used favorably in a solitary form or as a mixture as the abovementioned hydrolyzable, condensation-polymerizable organic titanium compound.

Acetylacetone is preferably added as a stabilizer for stabilizing an abovementioned organic titanium compound, titanium tetrachloride, or a hydrolysate of such a compound and forming a thin film of good external appearance. In terms of the number of moles, acetylacetone is preferably added at an amount that is two times that of the Ti in the abovementioned organic titanium compound, titanium tetrachloride, or hydrolysate thereof.

The abovementioned titanium oxide microparticles preferably have an average particle diameter of 2 nm or more and 120 nm or less. If the average particle diameter is less than 2 nm, the photocatalytic activity will be inadequate and the anti-fogging and anti-soiling properties will not be very good. An average particle diameter greater than 120 nm is unfavorable since the transparency of the thin film will then be low and the film will have a high haze factor. The most favorable particle diameter is 8 nm or more and 80 nm or less, and high transparency and high anti-fogging and anti-soiling performance will be secured within this range.

A favorable content of silica to be contained in the photocatalyst film is 10 weight % or more and 80 weight % or less, preferably 20 weight % or more and 60 weight % or less, and more preferably 30 weight % or more and 50 weight % or less. When this content is less than 10 weight %, though the photocatalytic action itself will not be lowered, the anti-fogging and anti-soiling performance will be short in endurance, and when the content is greater than 80 weight %, since the titanium content oxide will be low, the anti-fogging and anti-soiling performance will tend not to be exhibited by illumination of light.

Hydrolyzable and condensation-polymerizable organosilicon compounds, chlorosilyl-group-containing compounds, hydrolysates of such compounds, and silicon oxide, colloidal silica, silica microparticles, etc., obtained by heat treatment of the aforementioned compounds are used favorably as the silica (silicon oxide) in the film. In this case, an organosilicon compound or a chlorosilyl-group-containing compound may be used in solitary form or these may be mixed together. The silica in the film does not have to exist in the form of complete $SiO_2$ and may exist in a form bonded to an alkoxyl group, hydroxyl group, etc.

Silicon alkoxides, such as the methoxide, ethoxide, propoxide, butoxide, etc., of silicon, may be used favorably in a solitary form or as a mixture as the abovementioned hydrolyzable, condensation-polymerizable organosilicon compound, and high molecular weight type alkyl silicates, such as "Ethyl Silicate 40," made by Colcoat K.K. and "MS56," made by Mitsubishi Chemical, Ltd. may also be used. Commercially available alkoxysilane hydrolysate solutions, such as "HAS-10," made by Colcoat K.K., "Ceramica G-91" and "G-92-6," made by Nippan Lab. Corp., and "Atoron NSI-500,"made by Nippon Soda Co., Ltd., etc., may be used as the abovementioned hydrolysate of organosilicon compound.

The abovementioned chlorosilyl-group-containing compound is a compound having at least one chlorosilyl group ($-SiCl_nX_{3-n}$, where n is 1, 2, or 3,×is hydrogen or an alkyl group, alkoxy group, or acyloxy group with 1 to 10 carbon atoms) in the molecule. Among such compounds, those with at least two chlorine atoms are preferable and chlorosilanes, in which at least two of the hydrogen atoms in silane, $Si_nH_{2n+2}$ (where n is an integer from 1 to 5), have been replaced by chlorine and the other hydrogens have been replaced by an abovementioned alkyl group, alkoxy group, or acyloxy group, and condensation polymers of such chlorosilanes are preferable. Examples include tetrachlorosilane (silicon tetrachloride, $SiCl_4$), trichlorosilane ($SiHCl_3$), trichloromonomethylsilane ($SiCH_3Cl_3$), dichlorosilane ($SiH_2Cl_2$), and $Cl-(SiCl_2O)_n-SiCl_3$ (where n is an integer from 1 to 10). The hydrolysates of the abovementioned chlorosilyl-group-containing compounds may also be used and one or several from among such compounds may be used in combination. The most preferable chlorosilyl-group-containing compound is tetrachlorosilane. Since the chlorosilyl group is extremely high in reactivity, a dense coated film can be formed through self-condensation or condensation reaction with the substrate surface and a film that can adequately withstand practical use may be obtained even by drying at a low temperature (room temperature to 250° C.) in some cases.

Though the solvent of the solution, that contains the abovementioned organosilicon compound, or chlorosilyl-group-containing compound or a hydrolysate of such a compound, can basically be any solvent as long as it can practically dissolve the abovementioned organosilicon compound or chlorosilyl-group-containing compound or hydrolysate of such a compound, methanol, ethanol, propanol, butanol, and other alcohols are most preferable and the total concentration of the abovementioned organosilicon compound, chlorosilyl-group-containing compound, and hydrolysate of such a compound in the solvent should be 0.001 to 30 weight %.

Water is necessary for the hydrolysis of the abovementioned organosilicon compounds. The water may either be acidic or neutral, but in order to promote hydrolysis, water that is made acidic with hydrochloric acid, nitric acid, sulfuric acid, acetic acid, citric acid, sulphonic acid, etc., which have a catalytic effect, is preferably used. Although the added amount of acid is not limited in particular, a mole ratio, with respect to the organosilicon compound, of 0.001 to 20 is preferable. A mole ratio of added acid of less than 0.001 is not preferable since the hydrolysis of the organosilicon compound will not be promoted adequately and a mole ratio of more than 20 is not preferable in terms of handling because the acidity of the solution will be too high. In terms of just hydrolysis, the upper limit of the mole ratio, with respect to the organosilicon compound, of the added acid is 2. The degree of progress of hydrolysis will not change much when the amount of acid is increased further. However, with the addition of more acid, the strength of the film may increase significantly and a film that can adequately withstand practical use even upon drying at a low temperature (room temperature to 250° C.) may be obtained in some cases.

The coating solution with which an increase of strength of the photocatalyst film may be seen preferably has a composition such that the concentration of the compound containing at least one type of element selected from among Mg, Sc, V, Cr, Mn, Y, Nb, Mo, Ru, W, and Re is 0.0002 to 30 weight %, the concentration of the raw material of the titanium oxide microparticles is 0.0002 to 30 weight %, the concentration of silicon oxide as calculated from the organosilicon compound or hydrolysate thereof is 0.001 weight % or more and 3 weight % or less, the acid concentration is 0.001 moles/L or more and 1 mole/L or less, and the water content is 0.001 weight % or more and 10 weight % or less. A more preferable composition is such that the concentration of the abovementioned metal oxide is 0.01 weight % or more and 0.6 weight % or less, the abovementioned acid concentration is 0.01 moles/L or more and 0.3 moles/L or less, and the abovementioned water content is 0.001 weight % or more and 3 weight % or less.

Nitric acid or hydrochloric acid is preferably used as the acid in this case, and an acid with a concentration that is 0.3 times or more than that of the water content is preferably used. That is, if an acid is to be used in the form of aqueous solution, the solution is preferably a high-concentration acid with a concentration of 23.1% or more. When an acid is to be used in the form of an ethanol solution, if for example the ethanol solution contains 0.5 weight % of water, the concentration of the acid in the ethanol solution is preferably 0.15 weight % or more.

The mole ratio, with respect to the abovementioned organosilicon compound, of the added amount of water necessary for hydrolysis of the organosilicon compound is preferably 0.1 to 100. When the mole ratio of the added amount of water is less than 0.1, the hydrolysis of the organometallic compound will not be promoted adequately and a mole ratio of more than 100 is not preferable since the stability of the solution will tend to be low.

When an abovementioned chlorosilyl-group-containing compound is to be used, the water and acid do not have to be added necessarily. Even when no additional water or acid is added at all, the hydrolysis will progress due to the water contained in the solvent or the water contained in the atmosphere. Also the hydrochloric acid in the solution will dissociate in accompaniment with this hydrolysis, and this will cause the hydrolysis to progress further. However, there is no problem in adding additional water or acid.

The abovementioned organosilicon compound or chlorosilyl-group-containing compound is dissolved in the solvent, the catalyst and water are added, and hydrolysis is carried out for 5 minutes to 2 days at a fixed temperature between 10° C. and the boiling point of the solution. The hydrolyzable, condensation-polymerizable organic titanium compound, titanium tetrachloride, hydrolysate of such a compound, or titanium oxide, titanium oxide colloid, or titanium oxide microparticles, are obtained by heat treatment of an aforementioned compound and, where necessary, the stabilizer and dispersing agent are added, and the reaction is continued, if necessary, at a fixed temperature between 10° C. and the boiling point of the solution for 5 minutes to 2 days. The solution of a compound containing at least one type of element selected from among Mg, Sc, V, Cr, Mn, Y, Nb, Mo, Ru, W, and Re is then added to obtain the coating solution for forming the photocatalyst film. A catalyst and water do not have to be added in particular if a chlorosilyl-group-containing compound is to be used. The titanium oxide microparticles and the compound containing at least one type of element selected from among Mg, Sc, V, Cr, Mn, Y, Nb, Mo, Ru, W, and Re may be added prior to the above-described hydrolysis process. There are no particular restrictions in the order in which these are added and mixed. Also, in order to omit the hydrolysis of the organosilicon compound, an abovementioned commercially available solution of organosilicon compound hydrolysate may be used. The coating solution that is obtained may thereafter be diluted with a suitable solvent in accordance with the coating method.

The photocatalyst film may be formed on the substrate by applying the above-described coating solution for forming the photocatalyst film onto the substrate and then performing drying, and where necessary, heat treatment.

Examples of the substrate in the present invention include transparent or non-transparent plate-like members, fibers, powders, films, flakes, and various other formed articles, etc. that are made of glass, ceramic, plastic, or metal, etc. In the case where a plastic substrate or other substrate which has only a few hydrophilic groups on the substrate surface is to be used, the above-described coating is preferably performed after making the surface hydrophilic in advance by being subjected to plasma treatment or corona discharge treatment, or by making the substrate surface hydrophilic by illuminating with ultraviolet rays of a wavelength in the vicinity of 200 to 300 nm in an atmosphere containing oxygen.

Though depending on the conditions of attachment of dirt on the substrate, the above-described coating solution for forming the photocatalyst film may be repelled and be obstructed from being coated uniformly, this situation may be improved upon by performing washing or surface modification of the substrate surface. Washing and surface modification methods include degreasing washing with alcohol, acetone, hexane, or other organic solvents, washing with an alkali or acid, methods of polishing the surface with a polishing agent, ultrasonic washing and other washing methods, and surface modification methods, such as ultraviolet ray illumination treatment, ultraviolet ray ozone treatment, plasma treatment, corona discharge treatment, heat treatment, etc.

A known technique may be used as the method for coating, and though not restricted in particular, examples include methods using a spin coater, roll coater, spray coater, curtain coater or other device, methods, such as the dipping and drawing method (dip coating method), the flow application method (flow coating method), and various printing methods, such as screen printing, gravure printing, and curved surface printing.

After forming the above-described photocatalyst film on the substrate, the substrate is dried at a temperature between room temperature and 150° C. for 1 minute to 2 hours and thereafter heat treated if necessary at a temperature between 350° C. and the heat resistance temperature of the substrate in order to achieve densification, improvement of the crystallinity of titanium oxide, or conversion of the added compounds into oxides. The heat resistance temperature of the substrate refers to the upper limit temperature at which the characteristics of the substrate can be retained for practical purposes, and refers, for example, to the softening point or devitrification point (normally, 600 to 700° C.) in the case of a glass substrate or, for example, to the glass transition point, crystallization temperature, or decomposition point in the case of a plastic substrate. Though the heat treatment conditions will be restricted according to the type of substrate, in the case of a glass substrate, heat treatment is preferably carried out at 350 to 650° C. for 5 minutes to 2 hours.

The thickness of the photocatalyst film is preferably 2 to 500 nm. A thickness of less than 2 nm is not preferable since light cannot be absorbed adequately and anti-fogging and anti-soiling performance will be low.

A thickness of more than 500 nm is not preferable since the light carrier that is formed inside the film will not diffuse to the outer surface of the film, thus causing the photocatalytic activity to drop, the anti-fogging and anti-soiling performance to drop, and interference colors to be significantly visible. When the thickness is less than 20 nm, the retention of anti-fogging and anti-soiling performance when light is not shone will tend to be low and when the thickness is greater than 200 nm, the wear resistance will tend to be low. Thus the thickness of the photocatalyst film is more preferably 20 to 200 nm.

[Overcoat Layer]

With the present invention, anti-fogging and anti-soiling performance are further improved by the formation of an overcoat layer on top of the above-described photocatalyst film.

The abovementioned overcoat layer is a thin film comprised of at least one type of metal oxide selected from among silicon oxide, aluminum oxide, titanium oxide, zirconium oxide, and cerium oxide and preferably contains 50 weight % or more of silicon oxide.

The coating of the overcoat layer may be formed by applying, onto the substrate on which the above-described photocatalyst film has been formed, a solution containing at least one type of compound selected from the group comprised of hydrolyzable, condensation-polymerizable organometallic compounds of silicon, aluminum, titanium, zirconium, and cerium, chlorosilyl-group-containing compounds, and hydrolysates of such compounds or a solution obtained by adding silica microparticles to an abovementioned solution. The abovementioned silica microparticles are preferably used in the form of a solvent-dispersed sol (colloidal solution).

Examples of silica sols include commercially available water-dispersed sols, such as "Snowtex-OL," "Snowtex-O," "Snowtex-OUP," and "Snowtex-UP," made by Nissan Chemical Industries, K.K., and commercially available organic-solvent-dispersed silica sols, such as "IPA-ST" and "XBA-ST," made by Nissan Chemical Industries, K.K.

Chain-like microparticles are preferable as the above-described silica microparticles. By using microparticles of chain-like shape, the overcoat layer surface will be of an uneven profile that is intertwined in three-dimensions, and an uneven surface profile of high anti-fogging performance and high anti-fogging property retention can thus be formed. Examples of chain-like colloids include "Snowtex-OUP" and "Snowtex-UP," which are silica sols made by Nissan Chemical Industries, K.K., and these have a diameter of 10 to 20 nm and a length of 40 to 300 nm.

Though the dispersing medium for the abovementioned silica microparticles is not limited in particular as long as the silica microparticles are practically dispersed in a stable manner, a single or mixed medium of water, methanol, ethanol, propanol, etc., is preferable and water is especially preferable. Water and such lower alcohols mix readily with solutions containing the abovementioned organometallic compounds and are preferable since they can be removed readily by drying during film formation or by heat treatment after film formation. Among the above, water is most preferable in terms of the production environment.

In adding the abovementioned silica microparticles to the solution containing the abovementioned organometallic compound or chlorosilyl-group-containing compound, a dispersing agent may be added. The dispersing agent is not restricted in particular, and for example, electrolytes, such as sodium phosphate, sodium hexametaphosphate, potassium pyrophosphate, aluminum chloride, and iron chloride, various surfactants, various organic polymers, silane coupling agents, titanium coupling agents, and other substances that are generally used as dispersing agents may be used. The amount added is normally 0.01 to 5 weight % with respect to the abovementioned silica microparticles.

Though the abovementioned hydrolyzable, condensation-polymerizable organometallic compound, that is to be contained solitarily or along with the abovementioned silica microparticles in the coating solution for forming the overcoat layer, may basically be any compound that can undergo hydrolytic degradation and dehydration condensation, metal alkoxides and metal chelates are preferable.

As specific examples of metal alkoxides, the methoxide, ethoxide, propoxide, butoxide, etc., of silicon, aluminum, zirconium, titanium, or cerium may be used favorably in a solitary or mixed form. As examples of metal chelates, the acetylacetate chelate of silicon, aluminum, zirconium, titanium, etc., may be used favorably.

Silicon alkoxides that may be used include high molecular weight type alkyl silicates, such as "Ethyl Silicate 40," made by Colcoat K.K., Ltd. and "MS56," made by Mitsubishi Chemical Ltd. Silicon alkoxide hydrolysates that may be used include commercially available alkoxysilane hydrolysate solutions, such as "HAS-10," made by Colcoat K.K., Ltd., "Ceramica G-91" and "Ceramica G-92-6," made by Nippan Lab. Corp., and "Atoron NSI-500," made by Nippon Soda Co., Ltd.

The chlorosilyl-group-containing compound, that is to be contained solitarily or along with the abovementioned silica microparticles in the coating solution for forming the overcoat layer, is a compound having at least one chlorosilyl group (—$SiCl_nX_{3-n}$, where n is 1, 2, or 3, x is hydrogen or an alkyl group, alkoxy group, or acyloxy group with 1 to 10 carbon atoms) in the molecule. Among such compounds, those with at least two chlorine atoms are preferable and chlorosilanes, in which at least two of the hydrogen atoms in silane, $Si_nH_{2n+2}$ (where n is an integer from 1 to 5), have been replaced by chlorine and the other hydrogens have been replaced by an abovementioned alkyl group, alkoxy group, or acyloxy group, and condensation polymers of such chlorosilanes are preferable.

Examples include tetrachlorosilane (silicon tetrachloride, $SiCl_4$), trichlorosilane ($SiHCl_3$), trichloromonomethylsilane ($SiCH_3Cl_3$), dichlorosilane ($SiH_2Cl_2$), and Cl—$(SiCl_2O)_n$—$SiCl_3$ (where n is an integer from 1 to 10). The hydrolysates of the above chlorosilyl-group-containing compounds may also be used and these may be used solitarily or several such compounds may be used in combination. The most preferable chlorosilyl-group-containing compound is tetrachlorosilane. Since the chlorosilyl group is extremely high in reactivity, a coat of high wear resistance can be formed through self-condensation or condensation reaction with the substrate surface and a film that can adequately withstand practical use even upon drying at a low temperature (room temperature to 250° C.) may be obtained in some cases.

The solvent of the solution, that contains an abovementioned organometallic compound or chlorosilyl-group-containing compound or hydrolysate of such a compound, can basically be any solvent as long as it can practically dissolve the abovementioned organometallic compound or chlorosilyl-group-containing compound or hydrolysate of such a compound. To be more specific, methanol, ethanol, propanol, butanol, and other alcohols are most preferable and the total concentration of the abovementioned organometallic compound, chlorosilyl-group-containing compound, and hydrolysate of such a compound in the solvent may be 0.00001 to 30 weight %.

Water is necessary for the hydrolysis of the abovementioned organometallic compounds. The water may either be acidic or neutral, but in order to promote hydrolysis, water that is made acidic with hydrochloric acid, nitric acid, sulfuric acid, acetic acid, citric acid, sulphonic acid, etc., which have a catalytic effect, is preferably used.

The mole ratio, with respect to the abovementioned organometallic compound, of the added amount of water necessary for hydrolysis of the organometallic compound is preferably 0.1 to 100. When the mole ratio of the added amount of water is less than 0.1, the hydrolysis of the organometallic compound is not promoted adequately and a mole ratio of more than 100 is not preferable since the stability of the solution will tend to be low.

Although the added amount of acid is not limited in particular, a mole ratio, with respect to the organometallic compound, of 0.001 to 20 is preferable. A mole ratio of added acid of less than 0.001 is not preferable since the hydrolysis of the organometallic compound will not be promoted adequately and a mole ratio of more than 20 is not preferable in terms of handling because the acidity of the solution will be too high. In terms of just hydrolysis, the upper limit of the mole ratio, with respect to the organometallic compound, of the added acid is 2. The degree of progress of hydrolysis will not change much when the amount of acid is increased further. However, with the addition of more acid, the strength of the film may increase significantly and a film that can adequately withstand practical use even upon drying at a low temperature (room temperature to 250° C.) may be obtained in some cases.

A coating solution with which such an increase of film strength of the over coat layer can be seen preferably has a composition wherein the concentration of metal oxide, as calculated from the amount of organometallic compound or hydrolysate thereof, is 0.00001 weight % or more and 0.3 weight % or less, the acid concentration is 0.0001 moles/L or more and 1.0 mole/L or less, and the water content is 0.001 weight % or more and 10 weight % or less. More preferably, the coating solution has a composition wherein the abovementioned concentration of metal oxide is 0.001 weight % or more and 0.1 weight % or less, the abovementioned acid concentration is 0.01 moles/L or more and 0.3 moles/L or less, and the abovementioned water content is 0.001 weight % or more and 3 weight % or less.

Nitric acid or hydrochloric acid is preferable as the acid to be used in this case, and the use of an acid with a concentration of 0.3 times or more the water content is preferable. That is, when an acid in the form of aqueous solution is to be used, the acid is preferably a high-concentration acid with a concentration of 23.1% or more. When the acid is to be used in the form of an ethanol solution, if for example the ethanol solution has a water content of 0.5 weight %, the concentration of acid in the ethanol solution is preferably 0.15 weight % or more.

When an abovementioned chlorosilyl-group-containing compound is to be used, the water and acid do not have to be added necessarily. Even when no additional water or acid is added at all, the hydrolysis will progress due to the water contained in the solvent or the water contained in the atmosphere. The hydrochloric acid in the solution will dissociate in accompaniment with this hydrolysis, and this will cause the hydrolysis to progress further. However, there is no problem in adding additional water or acid.

It is not preferable for the content of the abovementioned silica microparticles in the film to be too low since the effect of adding the metal oxide microparticles, that is, the anti-fogging and anti-soiling performance and the retention of anti-soiling and anti-fogging properties that are obtained will be inadequate. On the other hand, when the content of the silica microparticles is too high, the metal oxide matrix phase, originating from the organometallic compound or chlorosilyl-group-containing compound, becomes discontinuous, and there will be a strong tendency for the film to be brittle and the strength of the film to be low. In addition, the anti-fogging and anti-soiling performance and the retention of anti-soiling and anti-fogging properties will be saturated and practically be unimproved.

The content of the silica microparticles in the film is thus preferably 5 weight % or more and 80 weight % or less, more preferably 10 weight % or more and 70 weight % or less, and even more preferably, 20 weight % or more and 60 weight % or less.

The abovementioned organometallic compound or chlorosilyl-group-containing compound is dissolved in the solvent, the catalyst and water are added, and hydrolysis is carried out for 5 minutes to 2 days at a fixed temperature between 10° C. and the boiling point of the solution. If silica microparticles are to be added, the silica microparticles and, if it is necessary, the dispersing agent are added, and the reaction is continued, if necessary, at a fixed temperature between 10° C. and the boiling point of the solution for 5 minutes to 2 days to obtain the coating solution for forming the overcoat layer.

In the case where a chlorosilyl-group-containing compound is to be used, the catalyst and water do not have to be added in particular. Also, the metal oxide microparticles may be added prior to the hydrolysis process. Also in order to omit the process of hydrolysis of the organometallic compound, an abovementioned commercially-available organometallic compound hydrolysate solution may be used. The coating solution that is thus obtained may thereafter be diluted with a suitable solvent in accordance with the coating method.

The above-described coating solution for forming the overcoat layer is coated onto the substrate on which the photocatalyst film has already been formed. Drying and, where necessary, heat treatment are then carried out to form a metal oxide overcoat layer on the substrate.

A known technique may be used as the method of coating, and though not restricted in particular, examples include methods using a spin coater, roll coater, spray coater, curtain coater or other device, methods, such as the dipping and drawing method (dip coating method), the flow application method (flow coating method), and various printing methods, such as screen printing, gravure printing, and curved surface printing.

After coating, the substrate is preferably dried at a temperature between room temperature and 150° C. for 1 minute to 2 hours and thereafter heat treated if necessary at a temperature between 350° C. and the heat resistance temperature of the substrate for 5 minutes to 2 hours. The heat resistance temperature of the substrate refers to the upper limit temperature at which the characteristics of the substrate can be retained for practical purposes, and refers, for example, to the softening point or devitrification point normally, 600 to 700° C. in the case of a glass substrate or, for example, to the glass transition point, crystallization temperature, or decomposition point in the case of a plastic substrate.

The above-described overcoat layer preferably has an average thickness of 0.1 to 50 nm. If this average thickness is less than 0.1 nm, the anti-fogging and anti-soiling performance improvement effect will not be significant, and an average thickness that is greater than 50 nm is not preferable since improvement of the hydrophilicity and anti-fogging property by illumination of light tend not to be exhibited.

The above-described overcoat is preferably a porous body. Here, a porous body refers to a thin film having numerous pores, a thin film having numerous gaps between particles, a thin film that is attached in insular form, etc., and preferably, a rate of porosity is 1 to 50%.

A porous overcoat layer and especially a porous overcoat layer with a rate of porosity of 1 to 50% is preferable since the ability to retain water on the surface will be great and the anti-fogging and anti-soiling performance will be improved further. Since the antifogging property recovery performance and hydrophilicity recovery performance upon illumination of light will also be improved further, the anti-fogging and anti-soiling performance will be high.

A porous overcoat layer can be obtained by adding at least one type of organic polymer, selected from the group comprised of polyethylene glycols, polypropylene glycols, and polyvinyl alcohols, to the above-described overcoat forming coating solution, coating the solution, obtained by dissolving the above components, onto a substrate on which the abovementioned photocatalyst film has been formed, drying this coated solution, and then heating at 350 to 650° C. for 5 minutes to 2 hours to decompose the added organic polymer compound.

The added amount of the abovementioned organic polymer compound is 1 weight % or more and 30 weight % or less, with respect to the total solids as oxide of the above-mentioned overcoat forming coating solution. An added amount of less than 1 weight % is not preferable since the formation of pores will be inadequate and the pore forming operation will not contribute to the improvement of the anti-fogging and anti-soiling performance. An added amount of more than 30 weight % is not preferable since the porous film that is obtained will be too brittle.

[Organic Substance Adhesion Prevention Layer]

An organic substance attachment prevention layer, such as that described below, is preferably formed on top of the above-described photocatalyst film and overcoat layer.

Immediately after illumination by ultraviolet rays, a titanium oxide film or other photocatalyst film with a high activity will have a small contact angle of 5 degrees or less and will exhibit considerably good initial anti-fogging performance. However, since the surface of such a film tends to readily absorb organic substance, the anti-fogging performance tends to degrade with time as the amount of adsorbed organic substance increases. With the present invention, a monomolecular-equivalent layer of $SiO_x$ (where x is 1 or 2) is preferably formed on the photocatalyst film surface. The adsorption of organic substance can thereby be restrained effectively and the degradation of anti-fogging property can be prevented while retaining high photocatalytic activity. A monomolecular-equivalent layer of $SiO_x$, which is an organic substance adhesion prevention layer, may be formed favorably by chemical adsorption of a vapor of a silicon compound, such as 1,3,5,7-tetramethylcyclotetrasiloxane, onto the photocatalytic surface or by applying a solution containing an organosilicon compound, such as tetraalkoxysilane, onto the photocatalyst film surface and then illuminating ultraviolet light in an oxygen atmosphere or heating to decompose the organosilicon compound. A monomolecular-equivalent layer of $SiO_x$ may also be formed directly by a vacuum vapor deposition method, LB method, a liquid phase precipitation method, etc. The anti-soiling performance will also be improved significantly by coating the surface of the photocatalyst film with an organometallic compound containing at least one type of functional group, selected from the group comprised of polyalkylene oxide groups, alkyl groups, alkenyl groups, and aryl groups, in the molecule or a hydrolysate of such an organometallic compound in place of the $SiO_x$ monomolecular-equivalent layer. Such organometallic compounds are decomposed gradually by illumination of ultraviolet light, temperature rise, and other external factors, and in the final stage, a monomolecular-equivalent layer of $SiO_x$ or other metal oxide will be formed to maintain the anti-soiling performance. Here, a monomolecular-equivalent layer refers to a molecular layer that is practically a monomolecular layer and in which 0.5 to 5 molecules are aligned on average in the thickness direction.

A polyethylene oxide group, polypropylene oxide group, etc., is mainly used as the polyalkylene oxide group to be contained in the molecule of the abovementioned organometallic compound. A chain alkyl group with 1 to 10 carbon atoms, such as the methyl group, ethyl group, propyl group, butyl group, pentyl group, hexyl group, octyl group, nonyl group, decyl group, etc., or an cyclic alkyl group with 3 to 10 carbon atoms, such as the cyclopentyl group, cyclohexyl group, etc., is mainly used as the abovementioned alkyl group. A group with 1 to 10 carbon atoms, such as the vinyl group, aryl group, butenyl group, propenyl group, hexenyl group, octenyl group, cyclohexenyl group, etc., is mainly used as the abovementioned alkenyl group. The phenyl group, tolyl group, xylyl group, etc. is mainly used as the abovementioned aryl group. Examples of organometallic compounds containing such a functional group, for example, a polyethylene oxide group, in the molecule include organosilanes, such as [alkoxy(polyethyleneoxy)alkyl] trialkoxysilane, [alkoxy(polyethyleneoxy)alkyl] trichlorosilane, etc., and organic titanium compounds, such as [alkoxy(polyethyleneoxy)alkyl] trialkoxytitanium.

These functional groups are favorable since they are non-polar or low in polarity and make the dirt attachment property low, restrain the rising of the contact angle with respect to water drops, and thus improve the anti-fogging property retention and hydrophilicity retention. An above-described anti-fogging, anti-soiling articles that has been made using an organosilane that contains a polyalkylene oxide group is especially good in anti-fogging characteristics, excellent in anti-fogging property retention and hydrophilicity retention (in other words, anti-soiling property), and is thus especially preferable. As has been mentioned above, when the hydrophilicity retention is high, the anti-soiling property is good.

Since the abovementioned functional groups are non-reactive or low in reactivity, they do not give rise to chemical bonding with dirt components, and since the dirt will not become fixed to the surface and the dirt that has become attached to the surface can be removed readily by wiping, etc., the anti-fogging property can be revived readily even when the anti-fogging property has become lost due to dirt.

The abovementioned organosilane that contains a polyalkylene oxide group is preferably an alkoxysilane or chlorosilane that contains an alkoxyl group or a chloro group in the molecule. Since an alkoxyl group or chloro group will readily undergo hydrolysis so that the organosilane can be strongly bonded chemically to the surface of the photocatalyst film or overcoat layer, a product of higher anti-fogging property retention can be obtained. Among the abovementioned organosilanes, alkoxysilanes that contain a polyethylene oxide group is preferable, and an [alkoxy (polyethyleneoxy)alkyl] trialkoxysilane, such as [methoxy (polyethyleneoxy)propyl] trimethoxysilane, is most preferable.

Any method by which an abovementioned organosilane or hydrolysate thereof can be contacted with the surface of the above-described photocatalyst film or overcoat layer may be used as the method for bonding or attaching an abovementioned organosilane or hydrolysate to the surface of the above-described photocatalyst film or overcoat layer. Examples include methods of coating a liquid containing an abovementioned organosilane or hydrolysate thereof onto the photocatalyst film or overcoat layer (coating methods), methods of immersing an article on which the photocatalyst film has been formed or an article on which the photocatalyst film with an overcoat has been formed in a liquid containing an abovementioned organosilane or hydrolysate thereof (liquid phase chemical adsorption methods), methods in which an abovementioned article is placed in a vapor of an abovementioned organosilane or hydrolysate thereof to cause the abovementioned organosilane or hydrolysate to become adsorbed on the surface (gas phase chemical adsorption methods), etc.

Of the abovementioned methods, coating methods are especially preferable since they are most simple and low in cost. A known technique may be used as the method of coating, and though not restricted in particular, examples include methods using a spin coater, roll coater, spray coater, curtain coater or other device, methods, such as the dipping and drawing method (dip coating method), the flow application method (flow coating method), methods in which the uneven photocatalyst film surface is contacted with a cloth or paper soaked with a coating solution and then rubbed by application of a suitable force (rubbing methods), and various printing methods, such as screen printing, gravure printing, and curved surface printing.

Though the solvent for dissolving an abovementioned organosilane is not restricted in particular, water, alcohols, and ketones are preferably used in a solitary or mixed form from the standpoint of safety, cost, and workability. Examples of alcohols include methanol, ethanol, propanol, butanol, etc., and examples of ketones include acetone, methyl ethyl ketone, diethyl ketone, etc.

An abovementioned organosilane is used upon being subjected to hydrolysis if necessary. Water, and where necessary, an acid catalyst are added to the organosilane solution, hydrolysis is carried out for a fixed amount of time under a fixed temperature, and the resulting solution is used for coating upon diluting if necessary.

Though the conditions of hydrolysis are not restricted in particular, the hydrolysis is preferably carried out for 3 minutes to 50 hours under a temperature of 20 to 60° C. If the temperature is lower than 20° C. or the time is shorter than 3 minutes, the promotion of hydrolysis will be inadequate. On the other hand, a temperature higher than 60° C. or a time longer than 50 hours is not preferable since the hydrolysis promotion effect will improve no further and the life of the coating solution will be short.

Besides mineral acids, such as hydrochloric acid, sulfuric acid, and nitric acid, organic acids, such as acetic acid, formic acid, citric acid, p-toluenesulfonic acid, etc., are used as the abovementioned acid catalyst. Though the amount of acid added is not restricted in particular, the mole ratio of the added acid to organosilane is preferably 0.0001 to 5. If the mole ratio of the added acid is less than 0.0001, the hydrolysis of organosilane will not be promoted adequately and a mole ratio of greater than 5 is not preferable since the hydrolysis promotion effect will improve no further and the acidity will be excessive.

Though the amount of water to be added for hydrolysis is not restricted in particular, the mole ratio of the water added to the organosilane is preferably 0.1 or more. A mole ratio of added water of less than 0.1 is not preferable since the hydrolysis of organosilane will not be promoted adequately.

On the other hand, with an [alkoxy(polyethyleneoxy) alkyl] trichlorosilane or other polyalkylene-oxide-group-containing organosilane with a high rate of hydrolysis, the hydrolysis may proceed adequately with just the water adsorbed on the surface of the photocatalyst film or overcoat layer and the organosilane may become fixed to the surface by a dehydration condensation reaction in some cases. In such a case, it is more preferable to prepare a coating solution using a non-aqueous solvent from which the dissolved water has been lessened adequately since weatherability, anti-fogging and anti-soiling properties, anti-fogging property retention, and hydrophilicity retention of the article that will be obtained will then be excellent. Examples of non-aqueous solvents include n-hexane, cyclohexane, xylene, toluene, etc.

Although the concentration of the organosilane solution used for coating is not restricted in particular, a concentration of 0.001 to 5 weight % is preferable. If the concentration is less than 0.001 weight %, adequate improvement of anti-fogging property retention and hydrophilicity retention will tend not to be seen in the anti-fogging, anti-soiling articles obtained, and a concentration of more than 5 weight % is not preferable since this will be uneconomical as the anti-fogging performance and anti-soiling performance will not be improved further.

After coating of the organosilane solution, the photocatalyst film or photocatalyst film with overcoat is preferably dried or heat treated for 3 minutes to 3 hours under a temperature of 20 to 180° C. By this treatment, the bonding of organosilane onto the surface will become strong and the durability, anti-fogging property retention, and hydrophilicity retention of the anti-fogging, anti-soiling articles will improve. A temperature lower than 20° C. or a time shorter than 3 minutes is not preferable since the abovementioned effects will be inadequate. A temperature higher than 180° C. is not preferable since the organosilane may decompose in some cases. A time longer than 3 hours is not preferable from the point of productivity since the abovementioned effects will improve no further.

If an organosilane monomolecular-equivalent layer is formed on top of the above-described photocatalyst film or overcoat layer, the anti-fogging property retention and anti-soiling property will improve. This organosilane layer will be decomposed gradually by illumination of ultraviolet light, temperature rise, and other external factors, and in the final stage, a monomolecular-equivalent layer of $SiO_x$ will be formed to maintain the anti-fogging property retention and anti-soiling property.

PREFERRED EMBODIMENTS OF THE INVENTION

Though the present invention shall now be described on the basis of examples, the present invention is not limited to these examples.

[Example 1 and Comparative Example 1]
Formation of Alkali-Blocking Film (Silica Film)

96.2 weight parts of ethanol and 3.8 weight parts of a hydrolysis condensation polymerization solution of ethyl silicate (trade name: HAS-10, made by Colcoat, K.K., silica content: 10 weight %) were mixed at room temperature and stirred for 1 hour to obtain a coating solution for forming an alkali-blocking silica film.

A soda lime silicate glass plate (150×150×3 mm), which had been surface polished and washed with a cerium oxide polishing agent, subject to ultrasonic washing in pure water, and then dried, was suspended vertically in an environment of 20° C. and 30% RH, and the abovementioned coating solution for forming an alkali-blocking silica film was made to flow from the upper end of the glass plate to coat a film onto the surface of one side of the glass plate (flow coating method). This glass plate was dried at 100° C. for 30 minutes, dried further at 250° C. for 30 minutes, and then heat treated for 1 hour inside a 500° C. oven to obtain a glass substrate on which an alkali-blocking silica film of approximately 30 nm thickness was formed.

Example 1

Formation of a Silica Film with Magnesium Oxide Added and Titanium Oxide Microparticles Dispersed 24 g of ethanol were added to 1 g of magnesium chloride hexahydrate to dissolve the magnesium chloride hexahydrate and thereby prepare a magnesium addition solution. 463 g of ethanol, 6 g of a hydrolysis condensation polymerization solution of ethyl silicate (trade name: HAS-10, made by Colcoat, K.K., silica content 10 weight %), 10 g of a titania microparticle dispersion (trade name: ST-K01, made by Ishihara Sangyo, Co., Ltd., titanium oxide content: 8 weight %, average diameter of titania microparticles: 35 nm, inorganic binder content: 2 weight %), and 25 g of the abovementioned magnesium addition solution were mixed and stirred at room temperature for approximately 1 hour to obtain a photocatalyst film forming coating solution.

The above-described soda lime silicate glass substrate with alkali-blocking silica film was suspended vertically in an environment of 20° C. and 30% RH, and the abovementioned photocatalyst film forming coating solution was made to flow from the upper end of the glass plate to coat a film on top of the alkali-blocking silica film of the glass substrate (flow coating method). Thereafter, the glass plate was heat treated for 1 hour at 500° C. to form a photocatalyst thin film comprised of silica with magnesium oxide added and titanium oxide microparticles dispersed. The sample obtained in this manner shall be referred to as sample A (glass substrate/silica film/silica thin film with magnesium oxide added and titanium oxide microparticles dispersed).

The silica thin film with magnesium oxide added and titanium oxide microparticles dispersed had a thickness of approximately 60 nm, a composition of 44.4 weight % silicon oxide, 44.4 weight % titanium oxide, and 11.1 weight % magnesium oxide and the Mg/Ti (atomic ratio) was 0.49.

Comparative Example 1

Formation of Silica Film with Titanium Oxide Microparticles Dispersed 463 g of ethanol, 6 g of a hydrolysis condensation polymerization solution of ethyl silicate (trade name: HAS-10, made by Colcoat, K.K., silica content: 10 weight %), and 10 g of a titania microparticle dispersion (trade name: ST-K01, made by Ishihara Sangyo, Co., Ltd., titanium oxide content: 8 weight %, inorganic binder content: 2 weight %) were mixed and stirred at room temperature for approximately 1 hour to obtain a photocatalyst film forming coating solution.

The above photocatalyst film forming solution was coated onto the above-described soda lime silicate glass substrate with alkali-blocking silica film by the flow coating method in the same conditions as those of the first example. Heat treatment of the same conditions as those of the first example was then carried out to obtain a glass substrate having formed thereon at an approximately 70 nm-thick silica thin film with titanium oxide microparticles dispersed. The sample obtained in this manner shall be referred to as sample B (glass substrate/silica film/silica thin film with titanium oxide microparticles dispersed).

Evaluation of Anti-fogging Property

The above-described samples A and B were left inside a room, which was not exposed to direct sunlight but was bright with indirect sunlight and into and from which people constantly entered and exited, and the degree to which the surface became soiled and the anti-fogging property dropped was evaluated by the degree of fogging that occurred upon exhalation onto the sample (exhalation test). That is, whereas with a sample immediately after the cleaning of the surface, fogging will not occur even upon exhalation onto the sample, when the sample is left inside the room, the dirt components in the atmosphere will become attached to the sample surface so that the sample will become fogged by the exhalation test. The time from which the leaving of the sample in the room was started to the time at which fogging began to occur (anti-fogging retention time) was used as an index of the anti-fogging retention. The greater this value, the higher the anti-fogging retention. The anti-fogging retention of the above samples were evaluated in accordance with Table 1 below.

Furthermore, onto a sample for which the anti-fogging property had been lowered upon leaving inside a room (i.e. a sample for which fogging had occurred in the above-described exhalation test), light from a xenon lamp (intensity of ultraviolet rays when no ultraviolet ray cutting filters were used: 2 mW/cm$^2$; measured by the ultraviolet ray photometer UVR-2/UD-36 made by Topcon K.K.) was illuminated via the ultraviolet ray cutting filter L-42 (made by Toshiba Glass Co., Ltd., transmittance at wavelengths of 390 nm or less: 0%, transmittance at a 400 nm wavelength: 5%, transmittance at a 420 nm wavelength: approximately 50%, transmittance at a 450 nm wavelength: approximately 80%, transmittance of visible light of 520 nm wavelengths or more: approximately 90%) for 2 hours continuously, and the magnitude of lowering of the water drop contact angle (water drop contact angle reviving amount) was used as an index of the anti-fogging property recovery. This anti-fogging property recovery also indicates the catalytic activity of the photocatalyst film. An ultraviolet ray (340 to 395 nm) illumination intensity of 2mW/cm$^2$ corresponds to approximately 80% of the ultraviolet ray intensity in direct sunlight from outdoor solar light at a location of lat. 35° N on a sunny day in winter. If the water drop contact angle is lowered by this light (visible light and weak ultraviolet light) from which ultraviolet rays have been cut, the sample can be said to have an extremely good anti-fogging property recovery. Using a contact angle gauge ("CA-DT," made by Kyowa Kaimen Chemical Co., Ltd.), the contact angle with respect to a water drop of 0.4 mg was measured before and after 2 hours of light illumination, the amount by which the contact angle dropped due to illumination was determined as a water drop contact angle reviving index defined as (contact angle after 2 hours of light illumination)/(contact angle before light illumination), and the antifogging property recovery was evaluated in accordance with Table 2 shown below. It can be said that the smaller this index, the stronger the tendency for the hydrophilicity to be improved by visible light and weak ultraviolet light.

TABLE 1

| Evaluation of anti-fogging property retention | Anti-fogging property retention period |
|---|---|
| ⊚ | Does not fog or the condition in which only a slight non-uniformity is seen continues for 9 days or more. |
| ○ | 6 days or more but less than 9 days |
| Δ | 3 days or more but less than 6 days |
| X | less than 3 days |

TABLE 2

| Evaluation of anti-fogging property recovery | Water drop contact angle recovery amount (water drop contact angle after 2 hours of light illumination)/(water drop contact angle before light illumination) |
|---|---|
| ⊚ | less than 50% |
| ○ | 50% or more and less than 70% |
| Δ | 70% or more and less than 90% |
| X | 90% or more |

Evaluation of Anti-soiling Property

The anti-soiling property was evaluated by the following outdoor exposure test. That is, sample plates were set vertically at an outdoor location in Itami City, Hyogo Prefecture, and an exposure test was performed for six months from February to July under an environment simulating a vertical surface under the eaves on which rainwater would flow down along the sample plate surface. The conditions of soiling of the sample plates after the test were evaluated visually in accordance with the standards of

TABLE 3

| Evaluation of anti-soiling property | Soiling conditions |
|---|---|
| ⊚ | Soiling can hardly be noticed. |
| ○ | Slightly soiled and thin streaks of dirt can be seen. |
| Δ | Soiled and streaks of dirt are conspicuous. |
| X | Considerably soiled and streaks of dirt are quite conspicuous. |

The various evaluation results for the abovementioned sample A and sample B are shown in Table 4. It is clear that sample A (Example 1) is considerably improved in anti-fogging property retention, anti-fogging property recovery, and anti-soiling property over sample B (Comparative example 1).

Example 2

Formation of Silica Thin Film with Scandium Compound Added and Titanium Oxide Microparticles Dispersed A scandium addition solution was prepared by dissolving 2 g of scandium trichloride hexahydrate in 48 g of commercially available alcohol (trade name: AP-7, made by Nihon Kaseihin, K.K., 85.5% ethanol, 9.6% 1-propanol, 4.9% 2-propanol).

1.7 g of tetrachlorosilane, 10.0 g of titania microparticle dispersion (trade name: ST-K01, made by Ishihara Sangyo, Co., Ltd.), and 32.5 g of the abovementioned scandium addition solution were added to 120 g of alcohol (trade name: AP-7, made by Nihon Kaseihin, K.K.) and mixing was performed for approximately 1 hour at room temperature to obtain a coating solution.

Without forming an alkali-blocking silica film, the above-mentioned coating solution was coated by the flow coating method of the same conditions as Example 1 onto the surface of a soda lime silicate glass plate (150×150×3 mm), which had been surface polished, washed, and dried in the same manner as in Example 1. This glass plate was dried at 100° C. for 30 minutes to obtain a glass substrate having formed thereon at an approximately 120 nm-thick silica film with scandium compound added and titanium oxide microparticles dispersed (41 weight % silica, 18 weight % scandium oxide (as $Sc_2O_3$), 41 weight % titanium oxide, Sc/Ti= 0.50 (atomic ratio)). The sample obtained thus shall be referred to as sample C (glass substrate/silica thin film with scandium compound added and titanium oxide microparticles dispersed). The various antifogging and anti-soiling performance evaluation results of sample C are shown in Table 4. These clearly show that sample C exhibits excellent anti-fogging and anti-soiling performance over sample B (Comparative example 1).

Example 3

Formation of Alkali Blocking Film (Silica-Zirconia Thin Film)

5 weight parts of zirconium butoxide were added to 1 weight part of ethyl acetoacetate and stirring was performed at 30° C. for 2 hours. The solution thus prepared shall be referred to as solution A. On the other hand, 1000 weight parts of 2-propanol, 2.5 weight parts of 1N nitric acid, and 50 weight parts of water were added to 50 weight parts of tetraethoxysilane and stirring was performed at 30° C. for 2 hours. The solution thus prepared shall be referred to as solution B. Solution A and solution B were then mixed and curing while stirring was performed at 50° C. for 3 hours and then at 30° C. for 1 day to obtain a sol solution for an alkali-blocking film.

A soda lime silicate glass plate (65 mm×150 mm×3 mm), which had been surface polished and washed with a cerium oxide polishing agent, subject to ultrasonic washing in pure water, and then dried, was immersed in the abovementioned sol solution for alkali-blocking film and the glass plate was then drawn out at a rate of 10 cm/minute. This glass plate was thereafter dried at room temperature for a few minutes and heat treated for 3 hours at 500° C. to obtain a glass plate on which a silica-zirconia thin film (92 weight % silica, 8 weight % zirconia) of approximately 30 nm thickness was formed.

Formation of Silica Thin Film with Vanadium Compound Added and Titanium Microparticle Dispersed The method for coating on a silica thin film with vanadium compound added and titanium microparticle dispersed by the sol-gel method shall now be described. 1.00 g of acetylacetone vanadyl were. dissolved by adding 0.79 g of 35% hydrochloric acid and 8.21 g of alcohol (trade name: AP-7, made by Nihon Kaseihin, K.K.) to prepare a vanadium addition solution. 0.34 g of tetrachlorosilane, 2.00 g of titania microparticle dispersion (trade name: ST-K01, Ishihara Sangyo, Co., Ltd.), and 2.66 g of the abovementioned vanadium addition solution were added to 95.00 g of alcohol (trade name: AP-7, made by Nihon Kaseihin, K.K.) and mixing was performed at room temperature for approximately 2 hours to obtain a coating solution. Using this coating solution, a film was formed by the flow coating method of Example 1 on the above-described soda lime silicate glass substrate with silica-zirconia film. Drying was then performed at room temperature to obtain sample D (glass substrate/silica-zirconia thin film/silica thin film with vanadium compound added and titanium microparticle dispersed).

Also, sample D was heat treated at 500° C. for 1 hour to form a silica thin film with vanadium oxide added and titanium microparticle dispersed. This sample shall be referred to as sample D' (glass substrate/silica-zirconia thin film/silica thin film with vanadium oxide added and titanium microparticle dispersed).

The silica thin film with vanadium compound added and titanium microparticle dispersed of sample D and the silica thin film with vanadium oxide added and titanium microparticle dispersed of sample D' both had a thickness of approximately 60 nm, a composition of 39 weight % silicon oxide, 39 weight % titanium oxide, and 22 weight % vanadium compound (as $V_2O_5$), and the V/Ti (atomic ratio) was 0.5.

The various anti-fogging and anti-soiling performance evaluation results of sample D and D' are shown in Table 4. These clearly show that both samples D and D' exhibit excellent anti-fogging and anti-soiling performance.

Example 4

Formation of Silica Thin Film with Chromium Oxide Added and Titanium Oxide Microparticles Dispersed A chromium addition solution was prepared by dissolving 1.00 g of chromium trichloride hexahydrate in 9.00 g of alcohol (trade name: AP-7, made by Nihon Kaseihin, K.K.). 0.34 g of tetrachlorosilane, 2.00 g of titania microparticle dispersion (trade name: ST-K01, made by Ishihara Sangyo, Co., Ltd.), and 2.67 g of the abovementioned chromium addition solution were added to 94.99 g of alcohol at room temperature and mixing was performed for approximately 1 hour at room temperature to obtain a coating solution. Using the same method as that of Example 1, a 70 nm-thick silica thin film with chromium oxide added and titanium oxide microparticles dispersed (40 weight % silicon oxide, 40 weight % titanium oxide, 20 weight % chromium oxide, Cr/Ti=0.50 (atomic ratio)) was formed on a soda lime silicate glass plate with silica film of the same type described in Example 1. The sample obtained thus shall be referred to as sample E (glass substrate/silica film I silica thin film with chromium oxide added and titanium oxide microparticles dispersed). The various anti-fogging and anti-soiling performance evaluation results of sample E are shown in Table 4. These clearly show that sample E exhibits excellent anti-fogging and anti-soiling performance.

Example 5

Formation of Silica Thin Film with Manganese Oxide Added and Titanium Oxide Microparticles Dispersed A manganese addition solution was prepared by dissolving 1.00 g of manganese chloride tetrahydrate in 9.00 g of alcohol (trade name: AP-7, made by Nihon Kaseihin, K.K.). 0.34 g of tetrachlorosilane, 2.00 g of titania microparticle dispersion (trade name: ST-K01, made by Ishihara Sangyo, Co., Ltd.), and 1.98 g of the abovementioned manganese addition solution were added to 95.68 g of alcohol (trade name: AP-7, made by Nihon Kaseihin, K.K.) and mixing was performed for approximately 1 hour at room temperature to obtain a coating solution. Besides changing the conditions of heat treatment after coating to 350° C. for 1 hour, the same method as that of Example 1 was used to form a silica thin film with manganese oxide added and titanium oxide microparticles dispersed (thickness: 80 nm, 41 weight % silicon oxide, 41 weight % titanium oxide, 18 weight % manganese oxide, Mn/Ti=0.50 (atomic ratio)) on a soda lime silicate glass plate with silica film of the same type described in Example 1. The sample obtained thus shall be referred to as sample F (glass substrate/silica film/silica thin film with manganese oxide added and titanium oxide microparticles dispersed). The various anti-fogging and anti-soiling performance evaluation results of sample F are shown in Table 4. These clearly show that sample F exhibits excellent anti-fogging and anti-soiling performance.

Example 6

Formation of Silica Thin Film with Yttrium Oxide Added and Titanium Oxide Microparticles Dispersed An yttrium addition solution was prepared by dissolving 1.00 g of yttrium chloride hexahydrate in 24.00 g of alcohol (trade name: AP-7, made by Nihon Kaseihin, K.K.). 0.05 g of tetrachlorosilane, 1.00 g of titania microparticle dispersion (trade name: ST-K01, made by Ishihara Sangyo, Co., Ltd.), and 3.80 g of the abovementioned yttrium addition solution were added at room temperature to 45.03 g of alcohol (trade name: AP-7, made by Nihon Kaseihin, K.K.) and mixing was performed for approximately 1 hour at room temperature to obtain a coating solution. Using the same method as that of Example 1, a silica thin film with yttrium oxide added and titanium oxide microparticles dispersed (thickness: 60 nm, 22 weight % silicon oxide, 46 weight % titanium oxide, 32 weight % yttrium oxide, Y/Ti=0.50 (atomic ratio)) was formed on a soda lime silicate glass plate with silica film of the same type described in Example 1. The sample obtained thus shall be referred to as sample G (glass substrate/silica film/silica thin film with yttrium oxide added and titanium oxide microparticles dispersed). The various anti-fogging and anti-soiling performance evaluation results of sample G are shown in Table 4. These clearly show that sample G is significantly improved in anti-fogging property recovery over sample B (Comparative example 1) and exhibits good anti-fogging property retention as well as excellent anti-soiling property.

Example 7

Formation of Silica Thin Film with Niobium Compound Added and Titanium Oxide Microparticles Dispersed A niobium addition solution was prepared by dissolving 1.00 g of niobium pentachloride in 9.00 g of alcohol. 0.3 g of tetrachlorosilane, 0.5 g of colloidal silica (trade name: Snowtex-OUP, made by Nissan Chemical Industries, K.K.), 2.00 g of titania microparticle dispersion (trade name: ST-K01, made by Ishihara Sangyo, Co., Ltd.), and 2.71 g of the abovementioned niobium addition solution were added to 94.95 g of alcohol (trade name: AP-7, made by Nihon Catechin, K.K.) and mixing was performed at room temperature for approximately 1 hour to obtain a coating solution. Besides not performing the heat treatment at 500° C., the same method as that of Example 1 was used to form a silica thin film with niobium compound added and titanium oxide microparticles dispersed (thickness: 90 nm, 43 weight % silicon oxide, 31 weight % titanium oxide, 26 weight % niobium pentachloride (as niobium oxide), Nb/Ti=0.50 (atomic ratio)) on a soda lime silicate glass plate with silica film of the same type described in Example 1. The sample obtained thus shall be referred to as sample H (glass substrate/silica film/silica thin film with niobium compound added and titanium oxide microparticles dispersed). The various anti-fogging and anti-soiling performance evaluation results of sample H are shown in Table 4. These clearly show that sample H exhibits excellent anti-fogging and anti-soiling performance.

Example 8

Formation of Silica Thin Film with Molybdenum Compound Added and Titanium Oxide Microparticles Dispersed A molybdenum addition solution was prepared by dissolving 2.16 g of ammonium molybdate in 22.84 g of 0.1N hydrochloric acid. 0.34 g of tetrachlorosilane, 2.00 g of titania microparticle dispersion (trade name: ST-K01, made by Ishihara Sangyo, Co., Ltd.), and 3.07 g of the abovementioned molybdenum addition solution were added at room temperature to 94.59 g of alcohol (trade name: AP-7, made by Nihon Catechin, K.K.) and mixing was performed at room temperature for approximately 1 hour to obtain a coating solution. Besides not performing the heat treatment at 500° C., the same method as that of Example 1 was used to obtain a glass substrate on which a titanium oxide thin film with molybdenum compound added is formed on a soda lime silicate glass plate with silica film of the same type described in Example 1. The sample obtained thus shall be referred to as sample I (glass substrate/silica film/silica thin film with molybdenum compound added and titanium oxide microparticles dispersed). The thickness of the titanium oxide thin film with molybdenum compound added of Sample I was approximately 40 nm. The silicon oxide content was 30 weight %, the titanium oxide content was 30 weight %, the ammonium molybdate content (as $NO_3$) was 40 weight %, and Mo/Ti=0.75 (atomic ratio). The various anti-fogging and anti-soiling performance evaluation results of sample I are shown in Table 4. These clearly show that sample I is significantly improved in anti-fogging property recovery over sample B (first comparative example) and exhibits good anti-fogging property retention as well as excellent anti-soiling property.

Example 9

Formation of Silica Thin Film with Tungsten Oxide Added and Titanium Oxide Microparticles Dispersed A tungsten addition solution was prepared by dissolving 0.50 g of tungstic acid in 9.00 g of alcohol. 0.34 g of tetrachlorosilane, 2.00 g of titania microparticle dispersion (trade name: ST-K01, made by Ishihara Sangyo, Co., Ltd.), and 2.50 g of the abovementioned tungsten addition solution were added at room temperature to 95.16 g of alcohol (trade name: AP-7, made by Nihon Catechin, K.K.) and mixing was performed for approximately 1 hour at room temperature to obtain a coating solution. The same method as that of Example 1 was repeated five times to form an approximately 350 nm-thick silica thin film with tungsten oxide added and titanium oxide microparticles dispersed (thickness: 350 nm, 36 weight % silicon oxide, 36 weight % titanium oxide, 28 weight % tungsten oxide, W/Ti=0.26 (atomic ratio)) on a soda lime silicate glass plate with silica film of the same type described in Example 1. The sample obtained thus shall be referred to as sample J (glass substrate/silica film/silica thin film with tungsten oxide added and titanium oxide microparticles dispersed). The various anti-fogging and anti-soiling performance evaluation results of sample J are shown in Table 4. These clearly show that sample J has excellent anti-fogging and anti-soiling properties.

Example 10

Formation of Silica Thin Film with Tungsten Oxide and Magnesium Oxide Added and Titanium Oxide Microparticles Dispersed A magnesium tungstate addition solution was prepared by dissolving 1.00 g of magnesium tungstate in 24.00 g of 0.1N hydrochloric acid. 0.34 g of tetrachlorosilane, 2.00 g of titania microparticle dispersion (trade name: ST-K01, made by Ishihara Sangyo, Co., Ltd.), and 6.81 g of the abovementioned magnesium tungstate addition solution were added at room temperature to 90.85 g of alcohol (trade name: AP-7, made by Nihon Catechin, K.K.) and mixing was performed for approximately 1 hour at room temperature to obtain a coating solution. The same method as that of Example 1 was carried out to form a silica thin film with tungsten oxide and magnesium oxide added and titanium oxide microparticles dispersed (thickness: 90 nm, 27 weight % silicon oxide, 27 weight % titanium oxide, 39 weight % tungsten oxide, 7 weight % magnesium oxide (W+Mg)/Ti= 1.00 (atomic ratio)) on a soda lime silicate glass plate with silica film of the same type described in Example 1. The sample obtained thus shall be referred to as sample K (glass substrate/silica film/silica thin film with tungsten oxide and magnesium oxide added and titanium oxide microparticles dispersed). The various anti-fogging and anti-soiling performance evaluation results of sample K are shown in Table 4. These clearly show that sample K has excellent anti-fogging and anti-soiling properties.

Example 11

An $SiO_x$ monomolecular layer film was formed on the surface of the silica film with magnesium oxide added and titanium oxide microparticles dispersed as in sample A. After setting sample A in a vacuum dessicator that was kept warm at 80° C., 200 $\mu$L of 1,3,5,7-tetramethylcyclotetrasiloxane (MCTS) was injected with a syringe. After maintaining this condition for 30 minutes, the temperature was raised to 100° C. and the interior of the dessicator was heated for 30 minutes while drawing a vacuum to remove the unreacted MCTS. By this method, a monomolecular film of MCTS was formed on the silica film with magnesium oxide added and titanium oxide microparticles dispersed. Then using a 500 W high-voltage mercury lamp, light was illuminated for 1 hour from a distance of 8 cm to oxidize and convert the TMCTS film to a monomolecular-equivalent film of $SiO_x$. Sample L (glass substrate/silica film with magnesium oxide added and titanium oxide microparticles dispersed/$SiO_x$ monomolecular-equivalent film) was thus obtained. The various anti-fogging and anti-soiling performance evaluation results of sample L are shown in Table 4. These clearly show that sample L has excellent anti-fogging and anti-soiling properties.

Example 12

A silica overcoat layer was formed by the following method on sample D'. 0.7 g of a hydrolysis condensation polymerization solution of ethyl silicate (trade name: HAS-10, made by Colcoat, K.K.) and 0.2 g of chain-like silica colloid (average particle diameter: approx. 15 nm, average length: approx. 170 nm, trade name: Snowtex OUP, made by Nissan Chemical Industries, K.K., 15 weight % solids) were mixed with 99.1 g of ethanol and mixing was performed for approximately 1 hour at room temperature to obtain a coating solution. The abovementioned coating solution was coated onto the surface of sample D' by the same method as the flow coating method indicated for Example 1 and heat treatment at 500° C. was performed for 1 hour to obtain sample M (glass substrate/silica-zirconia thin film/silica thin film with vanadium oxide added and titanium oxide microparticle dispersed/silica overcoat layer). The thickness of the silica overcoat layer was approximately 10 nm. The various anti-fogging and anti-soiling performance evaluation results of sample M are shown in Table 4. These clearly show that even better anti-fogging and anti-soiling properties are provided by the formation of the silica overcoat layer.

Example 13

An organic substance adhesion prevention layer, comprised of organosilane, was formed by the following method on sample J.

1 mL of 0.1 normal acetic acid was added to 1000 mL of commercially available ethanol (99.5%) and stirring was performed. To 796 g of this liquid mainly comprised of ethanol, 4 g of [methoxy(polyethyleneoxy)propyl] trimethoxysilane ("SIM6492.7" made by Chisso Co., Ltd., content: 90%, molecular weight: 460 to 590, 6 to 9 ethylene oxide units) and stirring was performed at 30° C. for 1 hour to prepare an organosilane coating solution.

The sample J prepared in Example 9 was immersed in the above-described organosilane coating solution and then drawn out at a rate of 5 cm per minute to coat the solution onto the surface of sample J. This sample was dried and heat treated at 120° C. for 30 minutes and then cooled to room temperature and washed gently with pure water to form an approximately 8 nm-thick organosilane layer containing polyethylene oxide groups in the molecule and thereby obtain sample N with a film composition of glass substrate/silica film/silica thin film with tungsten oxide added and titanium oxide microparticles dispersed/[methoxy(polyethyleneoxy)propyl]trimethoxysilane layer. The various anti-fogging and anti-soiling performance evaluation results of sample N are shown in Table 4. These clearly show that the anti-soiling performance is especially improved and that excellent anti-fogging and anti-soiling properties are provided by the formation of the organosilane layer.

Example 14

2.16 g of ammonium molybdate were dissolved in 22.84 g of 0.1N hydrochloric acid to obtain a molybdenum addition solution. 0.20 g of acetylacetone, 0.29 g of titanium isopropoxide, 2.00 g of a titania microparticle dispersion (trade name: STS-02, made by Ishihara Sangyo, Co., Ltd., titanium oxide content: approximately 30 weight %), and 4.36 g of the abovementioned molybdenum addition solution were added at room temperature to 94.44 g of alcohol (trade name: AP-7, made by Nihon Kaseihin, K.K.) and mixing was performed at room temperature for approximately 1 hour to obtain a coating solution. Besides not performing the heat treatment at 500° C., the same method as that of Example 1 was used to obtain a glass substrate on which a titanium oxide thin film with molybdenum compound added is formed on a soda lime silicate glass substrate with silica film of the same type described in Example 1.

Besides performing heat treatment at 400° C. for 1 hour instead of heat treatment at 500° C. for 1 hour, the same method as that indicated for Example 12 was carried out to form a silica overcoat layer on top of the abovementioned thin film.

The sample thus obtained shall be referred to as sample O (glass substrate/silica thin film/titanium oxide microparticle thin film with molybdenum oxide added/silica overcoat layer). The thickness of the titanium oxide thin film with molybdenum oxide added of sample O was approximately 100 nm. The composition was 69 weight % titanium oxide and 31 weight % molybdenum oxide and Mo/Ti=0.25 (atomic ratio). The various anti-fogging and anti-soiling performance evaluation results of sample O are shown in Table 4. These clearly show that sample O has excellent anti-fogging and anti-soiling properties.

Example 15

0.27 g of ruthenium trichloride monohydrate, 0.34 g of tetrachlorosilane, and 2.00 g of titania microparticle dispersion (trade name: ST-K01, made by Ishihara Sangyo, Co., Ltd.) were added at room temperature to 94.99 g of alcohol (trade name: AP-7, made by Nihon Kaseihin, K.K.) and mixing was performed for approximately 1 hour at 40° C. to obtain a coating solution. The same method as that of Example 1 was carried out to form a 60 nm-thick silica thin film with ruthenium oxide added and titanium oxide microparticles dispersed (33.3 weight % silicon oxide, 33.3 weight % titanium oxide, 33.3 weight % ruthenium oxide, Ru/Ti=0.60 (atomic ratio)) on a soda lime silicate glass substrate with silica film of the same type described in Example 1. The sample obtained thus shall be referred to as sample P (glass substrate/silica film/silica thin film with ruthenium oxide added and titanium oxide microparticles dispersed). The various anti-fogging and anti-soiling performance evaluation results of sample P are shown in Table 4. These clearly show that sample P has excellent anti-fogging and anti-soiling properties.

Example 16

0.10 g of rhenium trichloride, 0.34 g of tetrachlorosilane, and 2.00 g of titania microparticle dispersion (trade name: ST-K01, made by Ishihara Sangyo, Co., Ltd.) were added at room temperature to 103.99 g of alcohol (trade name: AP-7, made by Nihon Kaseihin, K.K.) and mixing was performed for approximately 1 hour at room temperature to obtain a coating solution. The same method as that of Example 1 was carried out to form a 75 nm-thick silica thin film with rhenium oxide added and titanium oxide microparticles dispersed (40 weight % silicon oxide, 40 weight % titanium oxide, 20 weight % rhenium oxide, Ru/Ti=0.16 (atomic ratio)) on a soda lime silicate glass substrate with silica film of the same type described in Example 1. The sample obtained thus shall be referred to as sample Q (glass substrate/silica film/silica thin film with rhenium oxide added and titanium oxide microparticles dispersed). The various antifogging and anti-soiling performance evaluation results of sample Q are shown in Table 4. These clearly show that sample Q has excellent anti-fogging and anti-soiling properties.

Comparative Example 2

A chromium addition solution was prepared by dissolving 0.10 g of chromium trichloride hexahydrate in 99.90 g of alcohol (trade name: AP-7, made by Nihon Kaseihin, K.K.). 0.34 g of tetrachlorosilane, 2.0 g of titania microparticle dispersion (trade name: ST-K01, made by Ishihara Sangyo, Co., Ltd.), and 2.67 g of the abovementioned chromium addition solution were added at room temperature to 94.99 g of alcohol and mixing was performed for approximately 1 hour to obtain a coating solution. Using the same method as that of Example 1, a 70 nm-thick silica thin film with chromium oxide doped and titanium oxide microparticles dispersed (49.85 weight % silicon oxide, 49.85 weight % titanium oxide, 0.30 weight % chromium oxide, Cr/Ti= 0.0064 (atomic ratio)) was formed on a soda lime silicate glass substrate with silica film of the same type described in Example 1. The sample obtained thus shall be referred to as sample R (glass substrate/silica film/silica thin film with chromium oxide doped and titanium oxide microparticles dispersed). The various anti-fogging and anti-soiling performance evaluation results of sample R are shown in Table 4. These clearly show that the antifogging and anti-soiling properties are not improved by the doping (addition of minute amounts) of Cr.

TABLE 4

| | Sample | Anti-fogging retention time (days) | Water drop contact angle recovery index(%) | Evaluation of anti-fogging property Retention | Evaluation of anti-fogging property Recovery | Evaluation of anti-soiling property |
|---|---|---|---|---|---|---|
| Example 1 | A | 6.1 | 70 | ○ | △ | ○ |
| Comparative example 1 | B | 3 | 100 | △ | X | △ |
| Example 2 | C | 3.1 | 66 | △ | ○ | ○ |
| 3 | D | 3.5 | 41 | △ | ◎ | ◎ |
|  | D' | 26.2 | 78 | ◎ | △ | ◎ |
| 4 | E | 12.1 | 62 | ◎ | ○ | ○ |
| 5 | F | 8.8 | 77 | ○ | △ | ○ |
| 6 | G | 6.1 | 54 | ○ | ○ | ○ |
| 7 | H | 18.1 | 71 | ◎ | △ | ○ |
| 8 | I | 3.2 | 44 | △ | ◎ | ◎ |
| 9 | J | 5.5 | 68 | △ | ○ | ○ |
| 10 | K | 6.3 | 65 | ○ | ○ | ○ |
| 11 | L | 9.1 | 62 | ○ | ○ | ○ |
| 12 | M | 38.3 | 48 | ◎ | ◎ | ◎ |
| 13 | N | 7.0 | 73 | ○ | △ | ◎ |
| 14 | O | 8.8 | 58 | ○ | ○ | ○ |
| 15 | P | 8.0 | 63 | ○ | ○ | ◎ |
| 16 | Q | 8.5 | 68 | ○ | ○ | ○ |
| Comparative example 2 | R | 2.5 | 99 | X | X | △ |

Applicability of the Invention to Industrial Use

As has been described above, since the photocatalyst article by the present invention exhibits high photocatalytic activity in an environment illuminated by weak ultraviolet light or visible light and the anti-fogging, anti-soiling glass article by the present invention clearly exhibits excellent anti-fogging and anti-soiling performance and retention of such performance and is also high in mechanical durability, these articles may be used favorably in automobile, construction, optical, and other applications. In particular, since these articles are made hydrophilic by weak ultraviolet light or visible light, they are advantageous for use in locations with low ultraviolet ray levels.

What is claimed is:

1. A photocatalyst article consisting of a metallic compound containing at least one type of element (A) selected from the group consisting of: magnesium, scandium, vanadium, chromium, manganese, yttrium, niobium, molybdenum, ruthenium, tungsten, and rhenium; and a metal oxide semiconductor (B); at a content whereby the ratio (A/B) of the number of metal atoms of said element (A) to the number of atoms of metal that comprise said metal oxide semiconductor (B) is 0.20 to 2.

2. A photocatalyst article consisting of a metallic compound containing at least one type of element (A) selected from the group consisting of: magnesium, scandium, vanadium, chromium, manganese, yttrium, niobium, molybdenum, ruthenium, tungsten, and rhenium; and a metal oxide semiconductor (B); at a content whereby the ratio (A/B) of the number of metal atoms of said element (A) to the number of atoms of metal that comprise said metal oxide semiconductor (B) is 0.20 to 2; and 10 to 80 weight % of silicon oxide.

3. The photocatalyst article as set forth in claim 1 or 2, wherein said oxide semiconductor is titanium oxide microparticles.

4. The photocatalyst article as set forth in claim 3, wherein said titanium oxide microparticles have an average particle diameter of 2 to 120 nm.

5. The photocatalyst article as set forth in claim 1, wherein said at least one type of element is selected from the group comprised of vanadium, niobium, and molybdenum.

6. An anti-fogging, anti-soiling article comprising a thin film formed on a substrate surface, the thin film consisting of:

(1) a compound, containing at least one type of element (A) selected from the group consisting of: magnesium, scandium, vanadium, chromium, manganese, yttrium, niobium, molybdenum, ruthenium, tungsten, and rhenium, and (2) a metal oxide semiconductor (B);

wherein the content ratio (A/B) of the number of metal atoms of said element (A) to the number of atoms of metal that comprises said metal oxide semiconductor (B) is 0.20 to 2.

7. An anti-fogging, anti-soiling article comprising a thin film formed on a substrate surface, the thin film consisting of:

(1) a compound, containing at least one element (A) selected from the group consisting of: magnesium, scandium, vanadium, chromium, manganese, yttrium, niobium, molybdenum, ruthenium, tungsten, and rhenium; and, (2) a metal oxide semiconductor (B), wherein the content ratio (A/B) of the number of metal atoms of said element (A) to the number of atoms of metal that comprise said metal oxide semiconductor (B) is 0.20 to 2; and, (3) 10 to 80 weight % of silicon oxide.

8. The anti-fogging, anti-soiling article as set forth in claim 6 or 7, wherein said oxide semiconductor is titanium oxide microparticles.

9. The anti-fogging, anti-soiling article as set forth in claim 8, wherein said titanium oxide microparticles have an average particle diameter of 2 to 120 nm.

10. The anti-fogging, anti-soiling article as set forth in claim 6, wherein said at least one type of element is selected from the group consisting of: vanadium, niobium, and molybdenum.

11. The anti-fogging, anti-soiling article as set forth in claim 6, wherein said thin film has a thickness of 2 to 500 nm.

12. The anti-fogging, anti-soiling article as set forth in claim 6, wherein said substrate is glass.

13. The anti-fogging, anti-soiling article as set forth in claim 12, wherein said substrate is glass with an alkali-blocking film.

14. The anti-fogging, anti-soiling article as set forth in claim 13, wherein said alkali-blocking film is comprised of at least one type of metal oxide selected from the group consisting of: silicon oxide, aluminum oxide, titanium oxide, zirconium oxide, and cerium oxide.

15. The anti-fogging, anti-soiling article as set forth in claim 13 or 14, wherein said alkali-blocking film is a film having silicon oxide as the main component thereof.

16. The anti-fogging, anti-soiling article as set forth in claim 13, wherein said alkali-blocking film has a thickness of 5 to 300 nm.

17. The anti-fogging, anti-soiling article as set forth in claim 6, wherein an overcoat layer, comprised of at least one type of metal oxide selected from the group consisting of: silicon oxide, aluminum oxide, titanium oxide, zirconium oxide; and cerium oxide, is formed on top of said thin film.

18. The anti-fogging, anti-soiling article as set forth in claim 17, wherein said overcoat layer has silicon oxide as the main component.

19. The anti-fogging, anti-soiling article as set forth in claim 17 or 18, wherein said overcoat layer has an average thickness of 0.1 to 50 nm.

20. The anti-fogging, anti-soiling article as set forth in claim 17, wherein said overcoat layer is a porous body with a porosity of 1 to 50%.

21. The anti-fogging, anti-soiling article as set forth in claim 17, wherein said overcoat layer contains silica microparticles at a content of 5 to 80 weight %.

22. The anti-fogging, anti-soiling article as set forth in claim 21, wherein at least part of said silica microparticles are chain-like silica microparticles.

23. The anti-fogging, anti-soiling article as set forth in claim 22, wherein said chain-like silica microparticles have a diameter of 10 to 20 nm and a length of 40 to 300 nm.

24. The anti-fogging, anti-soiling article as set forth in claim 6, wherein an organic substance adhesion prevention layer is formed on top of said thin film or on top of said overcoat layer.

25. The anti-fogging, anti-soiling article as set forth in claim 24, wherein said organic substance adhesion prevention layer is comprised of a silicon oxide layer or an organosilane, which contains at least one type of functional group selected from the group consisting of: polyalkylene oxide groups, alkyl groups, alkenyl groups, and aryl groups in the molecule, or a hydrolysate of such an organosilane.

26. The anti-fogging, anti-soiling article as set forth in claim 24 or 25, wherein said organic substance adhesion prevention layer has an average of 0.5 to 5 molecular layers in the thickness direction.

* * * * *

UNITED STATES PATENT AND TRADEMARK OFFICE
CERTIFICATE OF CORRECTION

PATENT NO.    : 6,576,344 B1
DATED         : July 21, 2003
INVENTOR(S)   : Kazuhiro Doushita and Hiroyuki Inomata It is certified that error appears in the above-identified patent and that said Letters Patent is hereby corrected as shown below:

<u>Title page,</u>
Item [30], Foreign Application Priority Data, change "Oct. 30, 1998 (JP) ………. 11-279058" to -- Sep. 30, 1998 (JP) ………. 10-279058 --

Signed and Sealed this

Twenty-first Day of October, 2003

JAMES E. ROGAN
*Director of the United States Patent and Trademark Office*